US006314480B1

(12) United States Patent
Nemazie et al.

(10) Patent No.: US 6,314,480 B1
(45) Date of Patent: Nov. 6, 2001

(54) MIXED-SIGNAL SINGLE-CHIP INTEGRATED SYSTEM ELECTRONICS FOR MAGNETIC HARD DISK DRIVES

(75) Inventors: Siamack Nemazie, San Jose; Kaushik Popat, Pleasanton; Balaji Virajpet, San Jose, all of CA (US); William R. Foland, Jr., Littleton, CO (US); Roger McPherson, Westminster, CO (US); Maoxin Wei, Lousville, CO (US); Vineet Dujari, Fremont, CA (US); Shiang-Jyh Chang, San Jose, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/435,719

(22) Filed: Nov. 8, 1999

Related U.S. Application Data

(60) Provisional application No. 60/107,776, filed on Nov. 8, 1998.

(51) Int. Cl.$^7$ ................................ G06F 13/00; G06F 9/00
(52) U.S. Cl. ................................ 710/74; 710/112; 326/38; 326/39
(58) Field of Search ............... 710/74, 112; 326/38, 326/39

(56) References Cited

U.S. PATENT DOCUMENTS

| | | | |
|---|---|---|---|
| 3,924,144 | 12/1975 | Hadamard | 326/16 |
| 4,812,678 | 3/1989 | Abe | 326/16 |
| 4,847,612 | 7/1989 | Kaplinsky | 340/825.8 |
| 5,027,315 | * 6/1991 | Agrawal et al. | 326/38 |
| 5,384,499 | 1/1995 | Pedersen et al. | 326/39 |
| 5,465,343 | 11/1995 | Henson et al. | 711/112 |
| 5,559,983 | 9/1996 | Masood | 711/112 |
| 5,586,306 | 12/1996 | Romano et al. | 710/112 |
| 5,596,765 | 1/1997 | Baum et al. | 712/38 |
| 5,634,081 | 5/1997 | Krakirian | 710/74 |
| 5,701,450 | * 12/1997 | Duncan | 712/245 |
| 5,757,582 | * 5/1998 | White et al. | 360/98.01 |
| 5,802,584 | 9/1998 | Kool et al. | 711/154 |

OTHER PUBLICATIONS

Welland, D. R., et. al., *A Digital Read/Write Channel with EPR4 Detection*, (ISSCC Digest of Technical Papers, pp. 276277, Feb., 1994).

Mita, S. et. al., *A 150 Mb/s PRML Chip for Magnetic Disk Drives*, (ISSCC Digest of Technical Papers, pp. 62–63, Feb., 1996).

Fields, J., et. al., *A 200 Mb/s EPRML Channel with Integrated Servo Demodulator for Magnetic Disks*, (ISSCC Digest of Technical Papers, pp. 314–315, Feb., 1997).

Tyson Tuttle, G., et. al., *A 130 Mb/s Read/Write Channel with Digital Servo Detection*, (SSCC Digest of Technical Papers, pp. 64–65, Feb., 1996).

Vishakhadadtta, G., et. al., *A 245 Mb/s Read/Write Channel With Digital Timing Recovery*, (ISSCC Digest of Technical Papers, pp. 388–389, Feb., 1998).

Darrell Dunn, *TI gives up [superchips0*, Electronics Buyers] News, Sep. 25, 2000, pp. 1, 124.

* cited by examiner

*Primary Examiner*—Thomas Lee
*Assistant Examiner*—Tammara Peyton
(74) *Attorney, Agent, or Firm*—Robert Paltt Bell; Dan Shifrin

(57) ABSTRACT

An integrated HDD system provides, in a single integrated circuit, RDC, servo logic, ATA interface, microprocessor, and other formerly discrete components in one highly integrated system design. The integrated circuit is rendered using a single integrated circuit technology type (e.g. digital CMOS) for all components. Analog and digital circuits are combined in such a way as to eliminate or reduce noise or interference in digital circuits from analog circuit components. The invention takes advantage of existing circuit design modules provided in the integrated circuit as "hard block" components which are unchanged by integrated circuit design software. Changes in operability of the overall integrated circuit may be readily achieved by altering "soft block" components to customize or tailor the design for a particular hard drive. Individual elements may have their outputs and inputs MUXed together such that individual elements can be selectively switched (during testing modes) such that the integrated circuit emulates or behaves in the same or similar manner as one of the prior art components.

15 Claims, 5 Drawing Sheets

MIXED-SIGNAL SINGLE-CHIP INTEGRATED SYSTEM ELECTRONICS FOR MAGNETIC HARD DISK DRIVES

CROSS-REFERENCE TO RELATED APPLICATIONS

The subject matter of the present application is related to that in copending applications, Ser. No. 09/470,763, filed Dec. 23, 1999, entitled *Method for Providing a Computing System With Fast Interrupt Priority Resolution*, and Ser. No. 09/339,638, filed Jun. 24, 1999, entitled *Method for Providing a Computing System With a Configurable System Memory Map*, both of which are incorporated herein by reference.

The present application claims priority from Provisional U.S. patent application Ser. No. 60/107,776, filed Nov. 8, 1998 and incorporated herein by reference.

FIELD OF THE INVENTION

The present invention relates to computer hard disk drive (HDD) controller circuitry, including read/write channel circuitry, ATA hard disk controller, micro-controller, and motion control servo block circuitry. In particular, the present invention is directed toward a novel integrated circuit encompassing all of the above-mentioned circuitry into a single integrated circuit device which is capable of retrieving and processing data at rates of 260 Mb/s.

BACKGROUND OF THE INVENTION

Prior art computer hard disk drives (HDDs) include a number of circuits for reading data and controlling the HDD. These circuits may include a PRML read channel (RDC), an ATA hard disk controller (HDC), a microcontroller (Uc), and a motion control servo block. In such prior art devices, each of these devices may be provided as one or more separate and discrete integrated circuits or chips. Thus, the entire HDD electronics package may comprise a circuit board provided with such a set of chips, along with interconnection circuitry.

Such a design suffers from a number of faults. Most apparent of these is cost. The use of separate discrete components for drive control and read circuitry drives up costs by requiring an increased number of discrete devices, assembly, and interconnection circuitry. In addition, the use of multiple devices decreases overall production yield, as the probability of a faulty device or interconnection occurring increases with the number of such devices in a circuit. HDDs are cost-sensitive devices. In addition, the use of separate, discrete components increases overall power consumption in a hard disk drive or the like.

Ever more complex software drives the demand for more powerful computers with greater storage capacities—at prices equivalent to, or less than, previous generation models. Consumers generally will not replace existing computers unless newer models are faster, more powerful, have a greater storage capacity, and are cheaper (or as costly) as well.

In addition to cost, speed and reliability are also factors. Market pressure creates a need for faster hard drive access times, as computer programs become more complex and hard drives ever increase in capacity. Throughput speeds of over 200 Mb/s may be required, and speeds of over 250 Mb/s are desirable.

In the prior art, such read and controller circuitry was typically provided in separate circuits for a number of valid reasons. Chief among these was the desire to separate digital control signals for the hard drive from the analog read signals from the hard drive. Expertise in managing noisy analog data signals and digital control signals on the same integrated circuit device was simply not available. Although a HDD may be thought of as a digital device by most computer users, the data read from the read head (or written to the write head) of an HDD is in fact a rather noisy analog signal which must be converted to digital form in order to provide the proper data output. In addition, circuitry must generally be provided to supply error correction to such a data stream (due in part to the high noise level in HDD analog signals).

In addition, the use of discrete components for separate HDD functions allowed drive manufacturers to tailor a solution for a particular hard drive design based upon combinations of individual discrete components. An integrated circuit solution for one type of HDD may not be satisfactory for other manufacturers or models. Thus, different integrated circuits may have to be designed for different hard drive manufacturers.

In addition, prior art discrete HDD circuits may be manufactured using different integrated circuit technologies. For example, high performance partial response maximum likelihood (PRML) read channel circuits have been generally realized using BI-CMOS or N-MOS integrated circuit technology. See, for example, Welland, D. R., et. al., A Digital Read/Write Channel with EPR4 Detection, .(ISSCC Digest of Technical Papers, pp.276277, February, 1994), Mita, S. et. al., *A 150 Mb/s PRML Chip for Magnetic Disk Drives*, (ISSCC Digest of Technical Papers, pp.62–63, February, 1996), Fields, J., et. al., *A 200 Mb/s EPRML Channel with Integrated Servo Demodulator for Magnetic Disks*, (ISSCC Digest of Technical Papers, pp.314–315, February, 1997), all of which are incorporated herein by reference. Such circuitry lends itself well to the large analog circuit portions typical of Prior Art read channel circuitry.

In contrast, other HDD system circuits, particularly digital control circuits, may be rendered in digital CMOS. Recent development of critical RDC blocks—such as an extended partial response, class 4 detector (EPR4), servo, finite impulse response (FIR) and interpolated timing recovery (ITR) in digital CMOS circuitry has enhanced volume manufacturability. See, for example, Tyson Tuttle, G., et. al., *A 130 Mb/s Read/Write Channel with Digital Servo Detection*, (SSCC Digest of Technical Papers, pp.64–65, February, 1996), and Vishakhadadtta, G., et. al., *A 245 Mb/s EPR4 Read/Write Channel with Digital Timing Recovery*, (ISSCC Digest of Technical Papers, pp.388–389, February, 1998), both of which are incorporated herein by reference.

In order to combine analog circuits such as the RDC with digital control circuits, a common integrated circuit technology may be needed in order to combine both analog and digital devices on one integrated circuit chip. As most Prior Art hard drive controller circuits utilize NMOS or Bi-CMOS circuitry, such designs may resist large scale integration.

Simply stated, the resultant die size for an NMOS or Bi-CMOS integrated hard drive control may be too large.

Cirrus Logic, Inc., Mass Storage Division, Broomfield Colorado, has been one of the few, if only, hard drive controller device manufacturers to utilize CMOS control circuits for both analog and digital circuitry in read channel controllers. The use of CMOS circuitry for both analog an digital devices is non-intuitive, as CMOS does not lend itself well (at least initially) to analog circuit design. However with the reduction from 0.8 micron technology to 0.35, 0.25 micron and smaller technologies, CMOS technology provides surprising advantages.

For example, in a read channel circuit, more analog components can be rendered as digital circuits. While such a design may initially appear to increase die size, as semiconductor technology shrinks to smaller resolutions (e.g., 0.25 micron), the resultant digital circuitry correspondingly shrinks. Analog circuitry, on the other hand, remains relatively static in size as integrated circuit technology shrinks. Thus, overall die size for a CMOS read channel circuit will shrink dramatically with decreases in semiconductor transistor size. Other types of technology (e.g., NMOS or Bi-CMOS) using largely analog circuits, do not show such a distinct shrinkage with decreases in transistor size.

Thus, CMOS read channels may be leveraged in system-level integration and, typically, benefit first from rapid process and lithography improvements. Moreover, the use of CMOS circuitry for an integrated hard drive controller remains a non-intuitive solution to the problem of further integrating hard drive circuitry.

In addition to the above-mentioned obstacles, such an integrated system-on-a-chip solution may be difficult to properly test, due to the inherent complexity of the device. Testing equipment and procedures for individual circuit components (RDC, ATA interface, processor, and the like), both for development and for production, is known in the prior art. However, an integrated HDD controller product may require an entirely new testing regime and equipment in order to properly test individual circuit functions. Moreover, given the level of integration, it might not be possible to properly and thoroughly test all circuits within such an integrated device due to the high level of integration.

In addition to testing difficulties, a large scale integrated device may be difficult to program and test. For example, a hard drive controller system may be programmed by an end user (e.g., hard drive manufacturer) with software or firmware which controls operation of the hard drive. Typically, such software development requires an iterative routine of programming and testing. Testing the hard drive controller may be achieved by running the software and monitoring selected pins of various devices in the hard drive controller.

For a Prior Art hard drive controller comprising a number of discrete circuit components, such development and testing provide little difficulty. However, when developing software for an integrated hard drive controller, a number of intermediate signal lines between components may not be "visible" at input or output pins of the device. Providing additional signal pins for such testing is expensive and difficult. Specialized chips may be made having such extra pins just for testing purposes. However, such chips are not representative of production devices and moreover incur additional cost in manufacturing such specialized devices.

Thus, what is needed is an inexpensive, integrated solution for a HDD read and control circuit which adequately protects digital signals from analog signal noise, using a common integrated circuit technology for all components, while still providing flexibility to be readily modified in design to work with a number of different HDD designs. In addition, a technique for testing individual elements within such a highly integrated circuit preferably using prior art equipment and methods would also be desirable, along with a technique for developing software for such a device.

SUMMARY OF THE INVENTION

The present invention comprises an integrated HDD system integrated circuit combining RDC, servo logic, ATA interface, microprocessor, and other formerly discrete components into one highly integrated system design. The integrated circuit is rendered using a single integrated circuit technology type (e.g., digital CMOS) for all components. Analog and digital circuits are combined in such a way as to eliminate or reduce noise or interference in digital circuits from analog circuit components.

In addition, the integrated circuit of the present invention takes advantage of existing circuit design modules to simplify the design and insure backward compatibility. Such components may be provided in the integrated circuit as "hard block" components which are unchanged by integrated circuit design software. Changes in operability of the overall integrated circuit may be readily achieved by altering "soft block" components to customize or tailor the design for a particular hard drive. By reserving existing elements as "hard blocks", testing and proving the overall system is greatly simplified, and system design time is reduced.

In addition, this present invention provides a method for testing individual elements within the integrated circuit using prior art techniques and equipment. Individual elements may have one or more of their outputs and inputs selectively MUXed together such that individual elements can be selectively switched (during testing modes) such that the integrated circuit emulates or behaves in the same or similar manner as one of the prior art components (e.g., RDC, HDC, Servo logic, processor, or the like). In such a testing mode, prior art testing equipment and techniques may be utilized to test individual hard block components to verify proper operation, both in development and in production testing.

In addition, selected inputs and outputs of individual elements may be MUXed to input or output pins of the device so as to allow a programmer to "view" selected signal lines within the device using standard testing equipment. Thus, for example, a software developer, developing software (firmware) for the device may be able to view individual signal lines which are not normally present at an output pin simply by programming the device to run in such a mode.

DETAILED DESCRIPTION OF THE INVENTION

Figure 1:
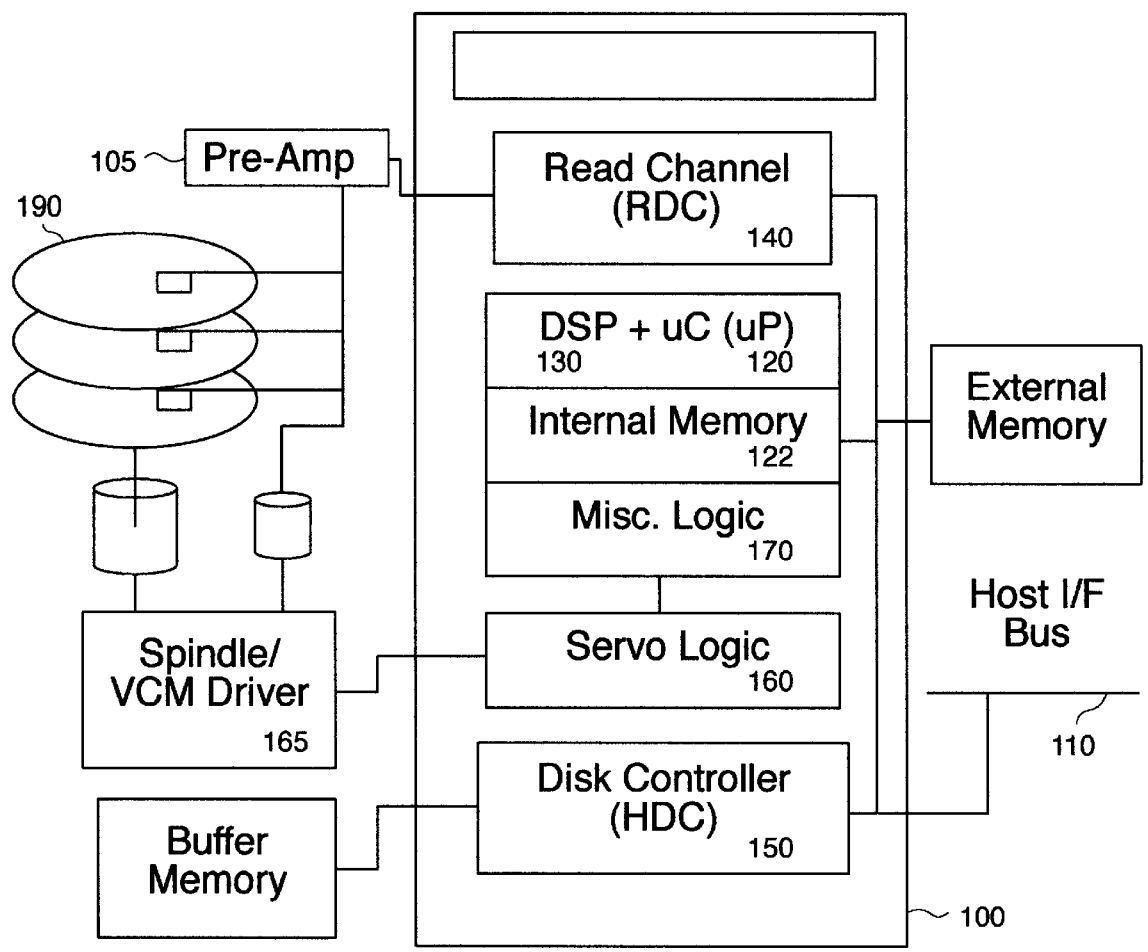
FIG. 1 is a block diagram illustrating Prior Art HDD system electronics.

FIG. 1 is a block diagram illustrating hardware functions performed by Prior Art HDD system electronics 100. Such electronics may be found packaged on a circuit board or the like within or attached to the HDD case or enclosure. Magnetic hard disk drive electronics typically implement an embedded CPU system 120 to manage specific real-time tasks, including controlling dedicated hardware blocks 140, 150, and 160, which handle the high speed data stream between disk 190 and host bus 110, and providing motion control via spindle/VCM driver 165 for the head and spindle. Traditionally, these hardware functions have been partitioned into several VLSI chips.

In the present invention, all of these functions are integrated into one integrated circuit chip. The operation and more detailed description of this integrated circuit chip may be found in the Cirrus Logic CL-SH8669 Preliminary Data Book, Version 0.9, November 1998, incorporated herein by reference.

Shaded segment 100 of FIG. 1 presents the elements to be integrated, optimized for minimum system cost, since these elements may be realized in standard CMOS. The present invention also enables future performance enhancements by integrating high bandwidth system buses on-chip, between functional blocks and integrated memory. Further, the present invention thus reduces system power and board area requirements.

Figure 2:
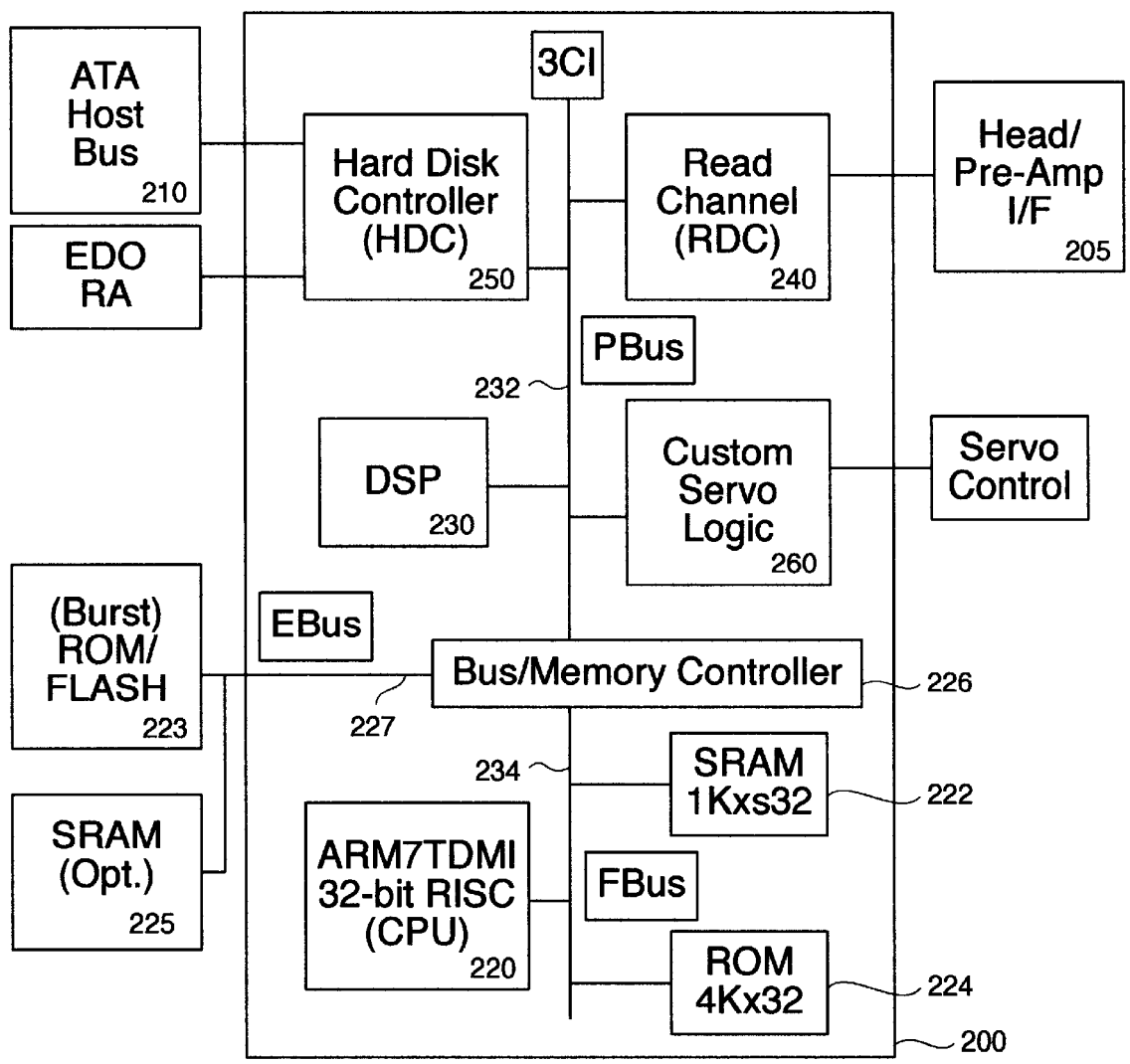
FIG. 2 is an integrated circuit IC Block Diagram of the HDD system electronics of the present invention.

FIG. 2 is an IC Block Diagram of the integrated HDD system electronics 200 of the present invention. During read operations, read/write channel (RDC hard block 240) extracts high speed (260 Mb/s) serial data from a noisy analog signal input from the magnetic head pre-amps and provides parallel data to the hard disk controller (HDC) 250. A description of an example of such a RDC block may be found in Welland, D. R., et. al., *A Digital Read/Write Channel with EPR4 Detection*, (ISSCC Digest of Technical Papers, pp.276–277, February, 1994), incorporated herein by reference.

HDC 250 formats the read data and applies error correction algorithms to it before supplying it to the Host via ATA host interface bus 210. During write operations, HDC 250 accepts data from host interface bus 210, formats it and appends ECC syndrome bits before sending it to RDC 240 for encoding, serialization and transmission to pre-amps 205 for write completion on the disk.

Servo algorithms used to control motion of the head and spindle are implemented by CPU 220 and DSP 230. Servo block 260 and RDC 240 provide feedback (via status registers) to CPU 220, and interface to pre-amps 205 and power drivers (not shown) controlling the head and spindle.

CPU 220 may comprise an ARM7TDMI microprocessor, designed by and licensed from ARM, Ltd. of Cambridge, England. The ARM7TDTMI is described in more detail in the *ARM Architecture Reference Manual* by D. Jaggar (Prentice Hall; ISBN 0-13-736299-4) incorporated herein by reference.

The ARM7TDMI module may comprise a standard verified design block which has been incorporated into the integrated circuit design of the present invention. Other processor blocks may also be used within the spirit and scope of the present invention. For example, other types of 8 to 64 bit (or other bit size) processors such as an Intel 196 series or ST-10 series processors (or other types of RISC or CISC processors) may be used without departing from the spirit and scope of the present invention.

Figure 3:
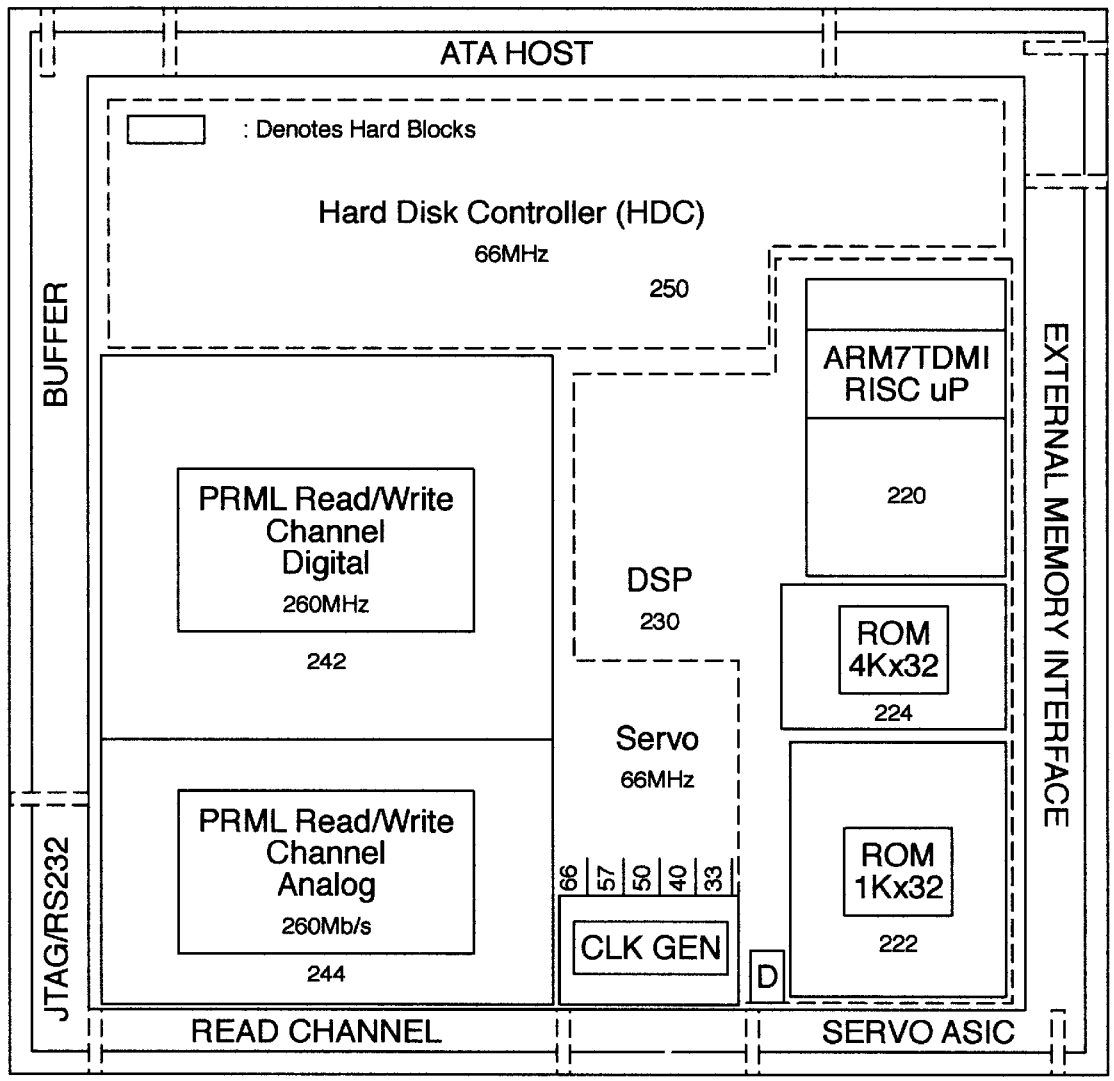
FIG. 3 is a diagram illustrating integrated circuit electrical and physical design layout for a preferred embodiment of the present invention.

CPU 220 may be coupled to on-chip SRAM 222 and ROM 224 as hard blocks, and DSP circuitry 230, bus interface logic 226 and peripherals (e.g., timers, interrupt, gpio, uart, not shown) as soft blocks. FIG. 3 is a diagram illustrating integrated circuit electrical and physical design layout for a preferred embodiment of the present invention. In FIG. 3, hard blocks are shaded while soft blocks are not. The term "hard block" is used to refer to design blocks which have already been laid out and thus are not disturbed or re-routed when using conventional integrated circuit layout software. Soft blocks, in contrast, may be altered in layout and design using integrated circuit layout design software.

The system architecture enables high speed execution (~35 MIPS) of a relatively small and highly optimized code base in which speed-critical code is handcrafted to fit into internal memory 222, 224. Code which is not speed-critical may be supplied in an external memory 223, 225 via Ebus 227. Thus no cache or MMU is required in this optimization for lowest cost. A well-organized system memory map— which will survive multiple product generations—has been developed.

The bus structure includes two main system buses. A CPU local bus (FBUS) 234 supports fast internal 32-bit wide memories 222 and 224. A peripheral bus supports all other devices (e.g., 16 or 8 bits wide). Both buses support all processor access types (e.g., 8/16/32 bit data accesses and 16/32 bit instruction fetches).

The peripheral bus, while logically a single bus, may have two variants: PBUS 232 and EBUS 227. PBUS 232 may connect internal modules and may have multiple physical segments to reduce power dissipation by allowing only addressed segments to be active. EBUS 227 may support external memories 223, 225 and/or I/O devices. Typically, a single 16-bit wide burst flash device 223 may be attached to EBUS 227 which may also provide debug and test visibility (when enabled) by echoing internal bus activity. These buses have been implemented within approximately 16 square millimeter areas each to effectively manage resistive and capacitive effects.

Figure 4:
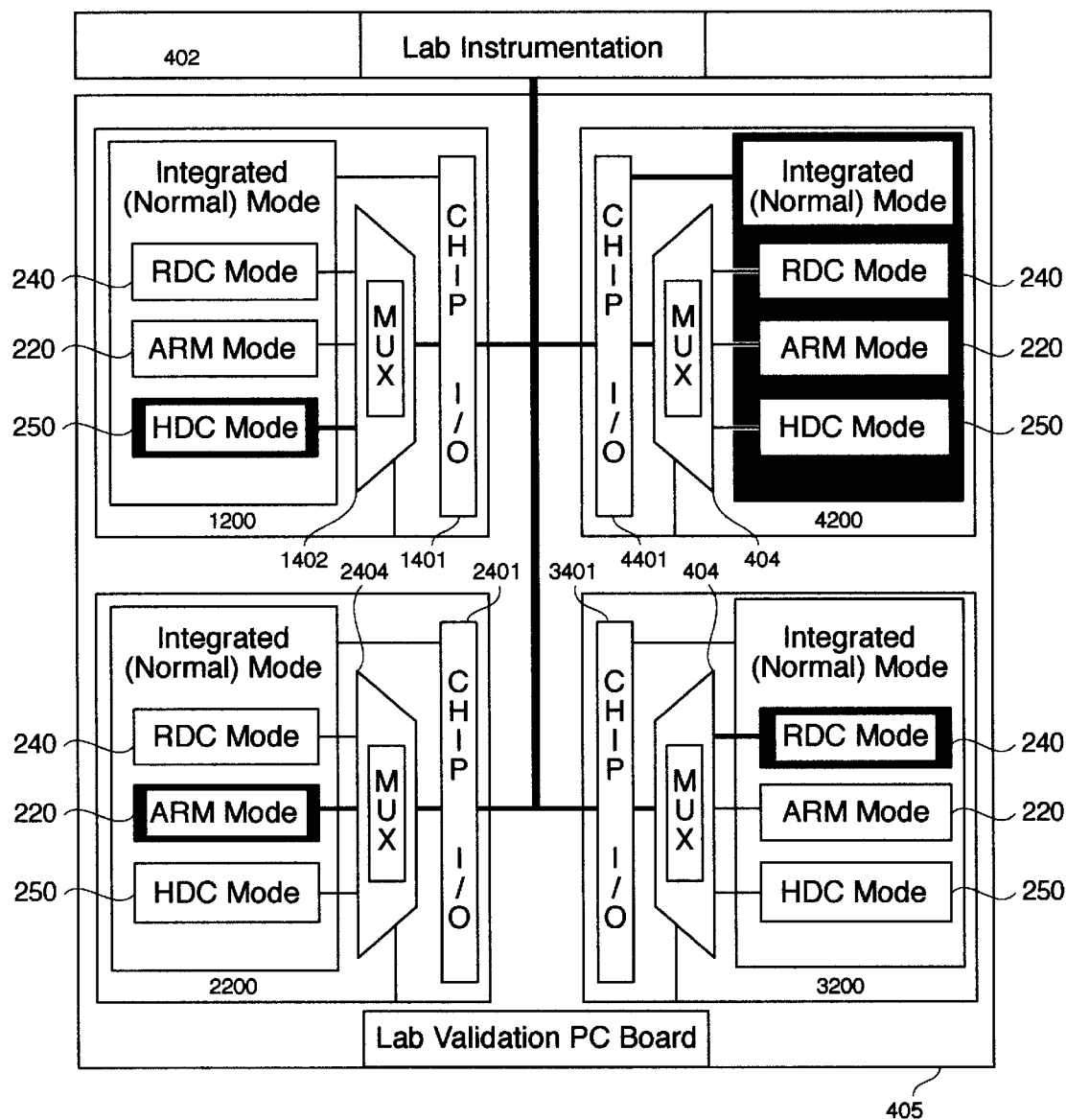
FIG. 4 is a block diagram illustrating operation of the validation modes used in testing the integrated circuit of the present invention.

The architecture of FIG. 2 may also support four or more operational modes to facilitate chip validation, as illustrated in FIG. 4. FIG. 4 is a block diagram illustrating operation of the validation modes used in testing integrated HDD system electronics 200 of the present invention. Various components of integrated HDD system electronics 200 of the present invention may be laid out and function in a manner similar or identical to, discrete component counterparts.

For example, HDC 250 may comprise functionality taken from the Cirrus Logic SH7660 discrete component HDC sold by Cirrus Logic, Inc. of Fremont, Calif. As noted above, the core logic for CPU 220 may be taken from a macro cell logic provided by ARM, Ltd. of Cambridge, England.

Testing equipment and testing parameters for such core circuits are known in the art. However, when a number of such macro cell units are combined onto one integrated circuit substrate (or packaged circuit element), such testing techniques and equipment may not be applicable. In particular, individual input and output signals for individual macro cell units in such a large-scale integrated circuit incorporating many such macro cell units may not appear at chip input and output pins, as in their discrete component counterparts.

As a result, either a whole new regime of tests must be established to test each macro cell component, or portions of the macro cell components may be untestable. The present invention, as illustrated in FIG. 4, provides a technique whereby individual macro cell units may be tested using prior art testing techniques and equipment.

As illustrated in FIG. 4, individual macro cell elements such as HDC 250, RDC 240, CPU 220, and the like may have their individual inputs and outputs multiplexed together with one or more chip I/O pins. Under normal operating conditions, the integrated HDD system electronics may operate as an integrated circuit hard drive controller as described above in connection with FIGS. 2–3. However, for testing purposes, the integrated HDD system electronics may be switched into one of a number of testing modes, as illustrated in FIG. 4.

FIG. 4 illustrates a lab validation PC board 405 provided with four integrated HDD system electronics 1200, 2200, 3200, and 4200, each coupled through a common bus to laboratory instrumentation 402. The arrangement illustrated in FIG. 4 is for purposes of illustration only. It will be appreciated by one of ordinary skill in the art that other configurations may be used for testing, including individual testing or testing in groups of other than four, or singularly. In addition, a PC board need not be used for testing purposes. Appropriate testing equipment, using a test socket or pins may be provided without departing from the spirit and scope of the present invention.

In FIG. 4, a first integrated circuit hard drive controller 1200 is illustrated being tested in HDC mode. In HDC mode, inputs and outputs to and from HDC macro cell 250 may be multiplexed to one or more chip I/O pins 1401 such that most or all of input and output signals to HDC macro cell 250 are routed through chip I/O pins 1401. In such a mode of operation, integrated HDD system electronics 1200 behaves similarly to, if not identically to, a discrete component version of HDC macro cell 250.

Testing procedures for HDC macro cell 250 are known in the art. Thus, once switched into HDC mode, HDC macro cell 250 integrated HDD system electronics 1200 may be readily tested using lab instrumentation 402 without any need for new testing procedures or equipment.

Similarly, in ARM mode, as illustrated by integrated HDD system electronics 2200 in FIG. 4, inputs and outputs of CPU core 220 are MUXed to chip I/O pins 2401 such that integrated HDD system electronics 2200 operates in a similar, if not identical manner, to a discrete component CPU 220. Test procedures for CPU 220 may then be performed using lab instrumentation 402.

Note that although illustrated here as being used with lab instrumentation 420, the MUXing technique of the present invention may be also be used for production testing and validation of integrated HDD system electronics 200. MUX 404 is provided within integrated HDD system electronics 200, and to may be selectively activated by transmitting appropriate codes to integrated HDD system electronics 200 or by holding certain I/O pins high or low on power-up.

Integrated HDD system electronics 3200 is illustrated as being in RDC mode. As the name implies, in RDC mode, RDC core 244 is MUXed through MUX 404 to chip I/O 3401 to lab instrumentation. In RDC mode, integrated HDD system electronics 3200 emulates a discrete component RDC in input and output responses and may be tested using conventional testing techniques and equipment.

Integrated HDD system electronics 4200 is illustrated as operating in a integrated (normal) mode. In this mode, MUX 404 of integrated HDD system electronics 4200 is set such that integrated HDD system electronics 4200 operates as a complete integrated system. Once each macro cell block has been validated using the HDC, ARM, and RDC modes, the overall circuit may be tested using additional test routines developed particularly for integrated HDD system electronics 200.

However, since fundamental logic blocks have already been validated, the amount and numbers of tests for the overall system are reduced. Further, validation of individual logic components enhances reliability of such testing and moreover may be useful in pinpoint problems in production or prototypes.

Pre-existing validation set-ups and vectors may be used in RDC and HDC modes. Internal buses, module I/Os and test nodes are made visible on the validation PC board. Selected inputs and outputs of individual elements may be MUXed to input or output pins of the device so as to allow a programmer to "view" selected signal lines within the device using standard testing equipment. Thus, for example, a software developer, developing software (firmware) for the device may be able to view individual signal lines which are not normally present at an output pin simply by programming the device to run in such a mode.

By setting appropriate registers or other indicia within the device, a developer may program one or more of a selected number of pins (e.g., eight) to echo signals from various internal elements in the device which ordinarily would not be present at pin-out. Thus, for example, signals on the internal Fbus 234 or Pbus 235 may be read out onto one or more selected pins. In addition, other signal lines (not shown) or internal signal lines from within an element of the device may be appropriately MUXed to one or more output pins.

Using such a technique, a software or firmware developer can test and develop software/firmware for the device without the need for a specialized pin-out prototype device, needle probes, or the like. Moreover, testing of an actual device (as opposed to a specialized pin-out prototype) will produce data more accurately reflecting the performance of production parts.

Note also that although only four "modes" of operation are illustrated in each of the chips of FIG. 4, other modes of operation may be enabled and moreover other elements of the integrated circuit hard drive controller may be tested. For example, custom servo logic or the like may be tested in a servo logic mode or may be otherwise isolated or have its outputs selectively MUXed for testing, evaluation, or other purposes.

Note that although described in the present invention for use in magnetic hard disk drives, the apparatus of the present invention may be adapted for use for other types of drives such as CD-ROM drives, floppy drives, tape drives, and the like.

Chip integration takes advantage of both hard and soft blocks. Stand-alone components, such as RDC 240 may be virtualized for reuse as hard blocks, to enable development concurrency and to minimize the calendar delay between stand-alone products and the integrated HDD system electronics of the present invention. Functional architecture, timing, noise and routability considerations drove hard block placements as illustrated in FIG. 3.

Top-level circuitry and HDC 250 may be implemented as soft blocks to maximally utilize intra-block silicon and creating an area-efficient design. In addition, such soft blocks may be later redesigned to customize the integrated HDD system electronics for a particular make or model of hard drive. Design hierarchy and timing considerations influence placement of sub-blocks such as CPU 220, DSP 230, and Servo Logic 260. Custom wireload models and placement-driven inter-block load estimation contributed to one-pass timing convergence in this nonrectangular layout.

Transition time (<2.5 ns) and cell-specific fanout constraints in the Synthesis library contributed to a routable netlist with timing margin. Static and dynamic timing analyses, based on RC-back-annotation, drove timing modification-is in ~0.1% of total net population (~50 K nets) Chip timing verification utilized hierarchical "black-box" models.

The RDC analog front-end 240 incorporates several noise isolation and minimization techniques. In addition, I/O interference was minimized by managing peak di/dt and staggered I/O switching. Transients were further isolated by placing strategic cuts in the I/O power buses to confine high frequency noise to smallest feasible paths, with dedicated VDD/VSS pads per segment to complete the loops. Core noise was reduced by adding ~12 nF of distributed capacitance in the power grid. Analog, PLL, edge sensitive and asynchronous I/Os have been isolated with dedicated VDD/VSS pads. Core and I/O VDD/VSS pads are also separated.

Figure 5:
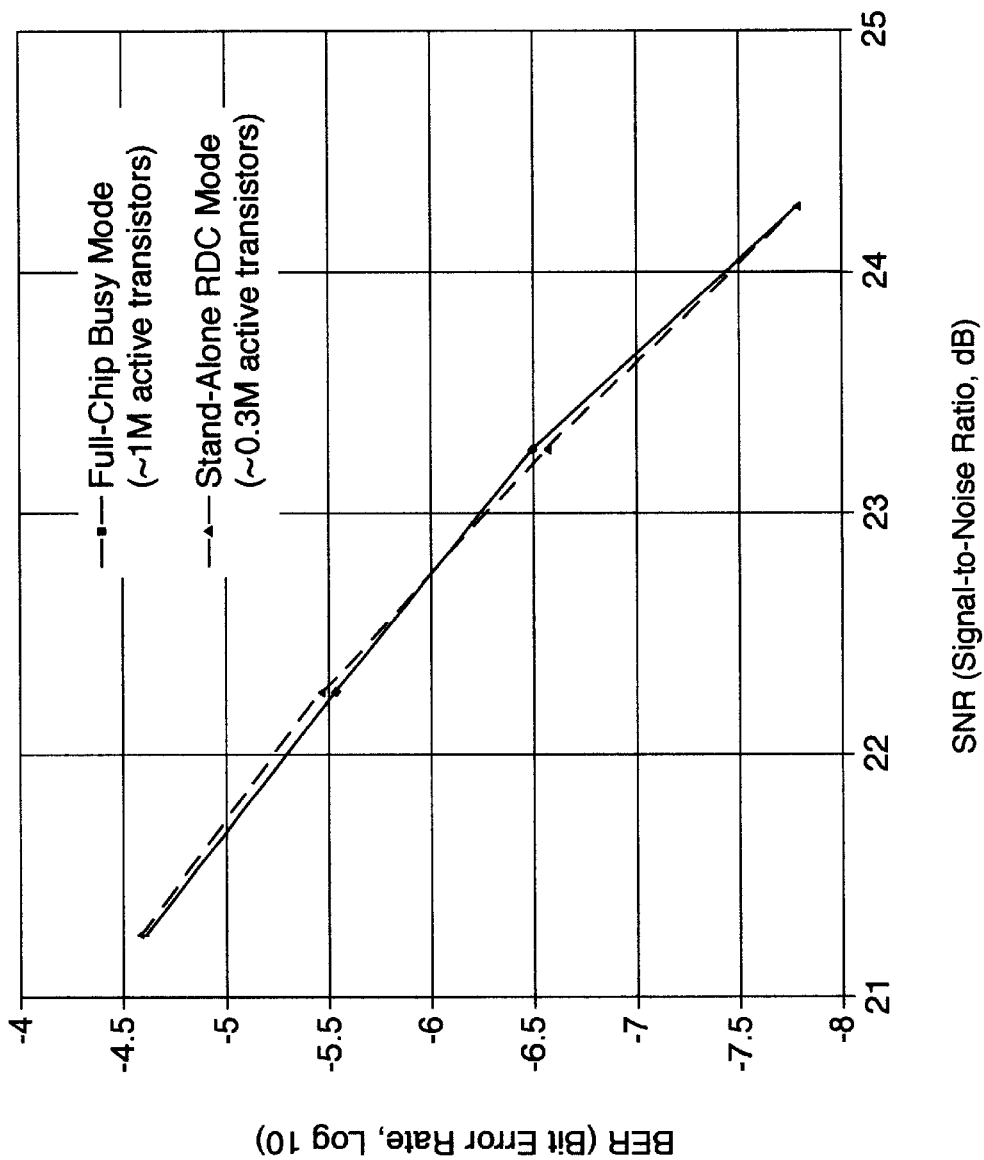
FIG. 5 is a graph illustrating the relationship between "Busy" versus Stand-Alone error rates indicating the apparatus of the present invention performs at acceptable levels.

Lab data on channel bit error rate (BER) vs. signal-to-noise ratio (SNR) was generated by convolving a 50% Lorentzian and 50% Gaussian pulse with the expected channel quality pattern at 244.3 MHz (User Density=2.14) as illustrated in FIG. 5. The entire read and servo paths in the chip (including ECC) are operational in the "busy" test, corresponding to ~1M active transistors; ~300 k transistors are active in the stand-alone RDC test.

The data produced in FIG. 5 is, in some ways, not surprising. Since the circuitry is enabled in CMOS, most of the additional digital circuits added to the core read/write channel analog/digital circuitry create little additional power draw. Thus, signal noise from this digital circuitry presents little additional signal noise for the analog portion of the read/write channel.

Lab data demonstrates no degradation in performance in integrated "Busy" vs. stand-alone RDC operation. Performance data is summarized in Table 1 below.

TABLE 1

| Die Size | 7.3 × 7.3 MM$^2$ |
|---|---|
| Technology | 0.35 um CMOS, 1-Poly, 3-Metal |
| Transistor Count | 1.45 M |
| Supply Voltage | 3.0 to 3.6 V |
| Operating Temperature | 0° C. to 70° C. |
| Power Dissipation at 3.3 V | 1.7 W |
| Package | 208QFP |
| Routing Pitch M1&3 (V); M2 (H) | 1.3 um; 1.5 um |
| ATA Host Interface | UDMA33 (33 MB/s) |
| User Data Rate | 260 Mb/s |

While the preferred embodiment and various alternative embodiments of the invention have been disclosed and described in detail herein, it may be apparent to those skilled in the art that various changes in form and detail may be made therein without departing from the spirit and scope thereof.

For example, while disclosed herein as read channel circuitry (RDC), such circuitry may also comprise read/write channel circuitry without departing from the spirit and scope of the present invention. Moreover, while disclosed herein in the context of a magnetic hard disk drive, the present invention may also be applied to tape drives, floppy disk drives, and CD-ROM drives or the like.

Similarly, while described herein as using an ATA interface, other types of interfaces may be used (storage device interface, storage area network interface, or network interface) without departing from the spirit and scope of the present invention. For example, a 1394, SCSI, FibreChannel, Gigabit Ethernet, or the like may be substituted for or augmented to the ATA interface disclosed herein.

We claim:

1. In a hard disk drive having one or more disk surfaces, a corresponding number of read/write heads, a spindle motor for rotating the disk surfaces, a voice coil motor for moving the heads relative to the disk surfaces, a head preamplifier, coupled to the number of read/write heads, a servo control coupled to the voice coil motor for driving the voice coil motor in response to control signals, an integrated hard disk drive controller integrated circuit comprising:

a host interface for interfacing with a host computer;

at least one internal communications and control bus, for transferring stored data and control data to and from elements within the integrated hard disk drive controller and interconnected with the host interface to transfer stored data and control data to and from the integrated hard disk drive controller;

at least one of a read channel controller and a read/write channel controller, coupled to the head preamplifier and the at least one internal communications and control bus, for receiving and processing read channel data from the head preamplifier;

a motion control servo logic, coupled to the at least one internal communications and control bus, and to the servo control, for generating control signals for driving the servo control;

a disk controller, coupled to the at least one internal communications bus, for transferring stored data to the host interface; and a microcontroller, coupled to the at least one internal communications bus, for generating control data to control devices within the integrated hard disk drive controller integrated circuit.

2. The integrated hard disk drive controller integrated circuit of claim 1, wherein the hard disk drive controller integrated circuit is rendered in complimentary Metal Oxide Semiconductor (CMOS) transistor circuitry.

3. The integrated hard disk drive controller integrated circuit of claim 1, further comprising:

a digital signal processor, coupled to the at least one internal communications bus, for processing raw stored data from the at least one of the read channel controller and a read/write channel controller and outputting processed stored data.

4. The integrated hard disk drive controller integrated circuit of claim 3, wherein said microcontroller comprises:

a microprocessor having a set of instructions for controlling a hard disk drive; and an internal memory for storing a first speed critical portion of microprocessor code and data containing instructions for processing, retrieving, and storing data to and from the hard disk drive, wherein the microprocessor accesses an external memory through the at least one internal communications bus to access a second non-speed critical portion of microprocessor code and data containing instructions not related to processing, retrieving, and storing date to and from the hard disk drive.

5. The integrated hard disk drive controller integrated circuit of claim 4, wherein said at least one internal communications bus comprises:

a microcontroller local bus coupled to said microprocessor and said internal memory for transferring the microprocessor code and data to and from the microprocessor;

a peripheral bus coupled to said microprocessor with said at least one of a read channel controller and a read/write channel controller, said motion control servo logic, said disk drive controller, and said digital signal processor;

an external memory bus, coupled to said microprocessor and an external memory, for transferring microprocessor code and data to and from said microprocessor; and a bus/memory controller, coupled to and interfacing said microcontroller local bus, said peripheral bus, and said external memory bus.

6. The integrated hard disk drive controller integrated circuit of claim 5, wherein a first portion of elements are provided as hard design blocks, and a second portion of elements are provided as soft design blocks such that the soft block components may be readily redesigned without redesigning the hard block components in order to customize the integrated hard disk drive controller integrated circuit.

7. The integrated hard disk drive controller integrated circuit of claim 1, wherein said internal communications bus further comprises:
    a MUX for selectively multiplexing outputs of one or more of the disk controller, the microprocessor, and the at least one of a read channel controller and a read/write channel controller with one or more I/O pins such that the integrated circuit may selectively output signals from one or more of the of the disk controller, the microprocessor, and the at least one of a read channel controller and a read/write channel controller.

8. The integrated hard disk drive controller integrated circuit of claim 1, wherein said internal communications bus further comprises:
    a MUX for selectively multiplexing outputs of one or more of the disk controller, the microprocessor, and the at least one of a read channel controller and a read/write channel controller with one or more I/O pins such that the integrated hard disk drive controller integrated circuit may selectively operate as a discrete disk controller, component microprocessor, and at least one of a read channel controller and a read/write channel controller.

9. A hard disk drive comprising:
   one or more disk surfaces;
   a number of read/write heads corresponding to the one or more disk surfaces;
   a spindle motor for rotating the disk surfaces;
   a voice coil motor for moving the heads relative to the disk surfaces;
   a head preamplifier, coupled to the number of read/write heads;
   a servo control coupled to the voice coil motor for driving the voice coil motor in response to control signals; and
   an integrated hard disk drive controller integrated circuit comprising:
      at least one internal communications and control bus, for transferring stored data and control data to and from elements within the integrated hard disk drive controller and with a host interface to transfer stored data and control data to and from the integrated hard disk drive controller;
      at least one of a read channel controller and a read/write channel controller, coupled to the head preamplifier and the at least one internal communications and control bus, for receiving and processing read channel data from the head preamplifier;
      a motion control servo logic, coupled to the servo control, for generating control signals for driving the servo control;
      a disk controller, coupled to the at least one internal communications bus, for transferring stored data to the host interface; and
      a microcontroller, coupled to the at least one internal communications bus, for generating control data to control devices within the integrated hard disk drive controller integrated circuit.

10. The hard disk drive of claim 9, wherein the hard disk drive controller integrated circuit is rendered in complimentary Metal Oxide Semiconductor (CMOS) transistor circuitry.

11. The hard disk drive of claim 9, wherein said integrated hard disk drive controller integrated circuit further comprises:
    a digital signal processor, coupled to the at least one internal communications bus, for processing raw stored data from the at least one of a read channel controller and a read/write channel controller and outputting processed stored data.

12. The hard disk drive of claim 11, wherein said microcontroller comprises:
    a microprocessor having a limited command set of instructions optimized for controller a hard disk drive; and
    an internal memory for storing a first portion of microprocessor code containing instructions for processing, retrieving, and storing data to and from the hard disk drive,
    wherein the microprocessor accesses an external memory through the at least one internal communications bus to access a second portion of microprocessor code containing instructions not related to processing, retrieving, and storing date to and from the hard disk drive.

13. The hard disk drive of claim 12, wherein said at least one internal communications bus comprises:
    a microcontroller local bus coupled to said microprocessor and said internal memory for transferring the microprocessor code and data to and from the microprocessor;
    a peripheral bus coupled to said microprocessor with said at least one of a read channel controller and a read/write channel controller, said motion control servo logic, said disk drive controller, and said digital signal processor;
    an external memory bus, coupled to said microprocessor and an external memory, for transferring microprocessor code and data to and from said microprocessor; and
    a bus/memory controller, coupled to and interfacing said microcontroller local bus, said peripheral bus, and said external memory bus.

14. The hard disk drive of claim 13, wherein said at least one of a read channel controller and a read/write channel controller, said microprocessor, and said internal memory are provided as hard design blocks, and said disk controller and servo controller are provided as soft design blocks such that the soft block components may be readily redesigned without redesigning the hard block components in order to customize the integrated hard disk drive controller integrated circuit.

15. The hard disk drive of claim 14, wherein said internal communications bus further comprises:
    a MUX for selectively multiplexing outputs of the disk controller, the microprocessor, and the at least one of a read channel controller and a read/write channel controller with one or more I/O pins such that the integrated hard disk drive controller integrated circuit may selectively operate as a discrete disk controller, component microprocessor, and at least one of a read channel controller and a read/write channel controller.

* * * * *